United States Patent
De Lang et al.

(10) Patent No.: US 6,761,506 B2
(45) Date of Patent: Jul. 13, 2004

(54) PIPE LAY SYSTEM WITH TENSION COMPENSATOR

(75) Inventors: Peter Eric De Lang, Helmond (NL); Wilhelmus Coenradus Johannes Jozephus Woldring, Rotterdam (NL); Johan Albert Commandeur, Zwijndrecht (NL)

(73) Assignee: IHC Gusto Engineering B.V., Schiedam (NL)

( * ) Notice: Subject to any disclaimer, the term of this patent is extended or adjusted under 35 U.S.C. 154(b) by 0 days.

(21) Appl. No.: 10/148,266
(22) PCT Filed: Nov. 29, 2000
(86) PCT No.: PCT/NL00/00869
§ 371 (c)(1), (2), (4) Date: Oct. 9, 2002
(87) PCT Pub. No.: WO01/38768
PCT Pub. Date: May 31, 2001

(65) Prior Publication Data
US 2003/0118409 A1 Jun. 26, 2003

(30) Foreign Application Priority Data
Nov. 29, 1999 (EP) .......................................... 99204033

(51) Int. Cl.⁷ ................................................. F16L 1/12
(52) U.S. Cl. .................... 405/168.3; 405/158; 405/166; 405/174; 242/154; 72/183
(58) Field of Search ............................. 405/154.1, 158, 405/166, 167, 168.1, 168.4, 174, 175; 242/154, 155 R, 155 BW, 149, 557, 566, 594.1, 595.1, 615.2, 615.3; 72/146, 160, 183, 164

(56) References Cited

U.S. PATENT DOCUMENTS

| | | | | |
|---|---|---|---|---|
| 3,982,402 A | | 9/1976 | Lang et al. | |
| 4,297,054 A | * | 10/1981 | Yenzer et al. | 405/168.3 |
| RE30,846 E | * | 1/1982 | Lang et al. | 405/168.3 |
| 4,410,291 A | * | 10/1983 | Speraggi | 405/164 |
| 4,454,999 A | * | 6/1984 | Woodruff | 242/388.7 |
| 4,820,082 A | * | 4/1989 | Recalde | 405/168.3 |
| 4,961,671 A | * | 10/1990 | Recalde | 405/168.3 |
| 5,139,751 A | * | 8/1992 | Mansfield et al. | 242/390.2 |
| 5,718,538 A | * | 2/1998 | Recalde | 405/168.1 |
| 6,056,478 A | * | 5/2000 | Martin et al. | 405/168.3 |
| 6,328,502 B1 | * | 12/2001 | Hickey et al. | 405/168.3 |
| 6,419,424 B1 | * | 7/2002 | Null et al. | 405/174 |
| 6,554,538 B2 | * | 4/2003 | Stockstill | 405/168.3 |

FOREIGN PATENT DOCUMENTS

| | | | | |
|---|---|---|---|---|
| GB | 2244321 | * | 11/1991 | 405/168.3 |
| WO | WO 95/22484 | | 8/1995 | |

* cited by examiner

*Primary Examiner*—Jong-Suk (James) Lee
(74) *Attorney, Agent, or Firm*—Young & Thompson

(57) ABSTRACT

A pipe lay vessel with a reel for carrying a length of pipe and first drive part for controlling rotation of the reel. A substantially vertical guide structure includes at its upper end a deflection member for deflecting the pipe from a first trajectory extending between the reel and the guide structure to a second, substantially vertical trajectory. A clamping member carries the vertical pipe section and has second drive for feeding the pipe along the vertical trajectory. A movable tension compensator (7) is provided at the first pipe trajectory for lengthening or shortening the first pipe trajectory to maintain a substantially constant tension of the pipe along the first trajectory during unwinding of the reel. By displacing the tension compensator, the first pipe trajectory can be lengthened or shortened to compensate for variations in speed due to non-uniform winding of the pipe and varying diameter of the spooled pipe and to compensate for sagging of the pipe due to its own weight and length variations upon unspooling in view of occuring plasticity and partial straightening of the pipe.

7 Claims, 4 Drawing Sheets

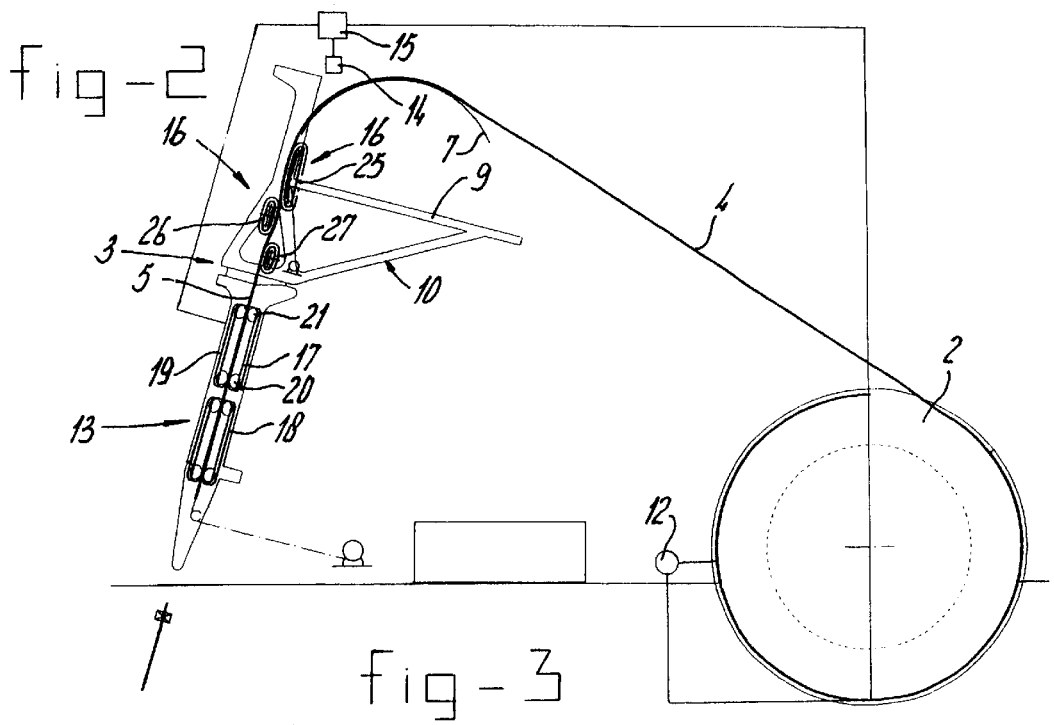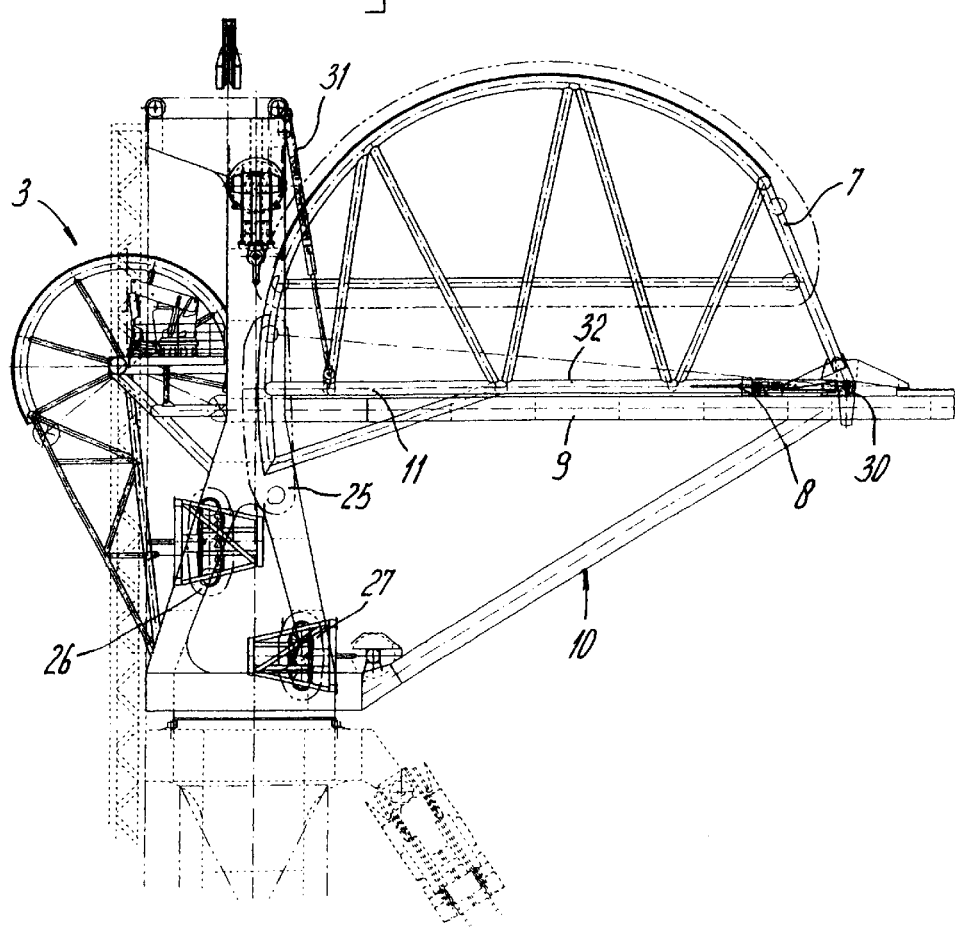

PIPE LAY SYSTEM WITH TENSION COMPENSATOR

BACKGROUND OF THE INVENTION

The invention relates to a pipe lay vessel with a reel for carrying a length of pipe and first drive means for controlling rotation of said reel, a substantially vertical guide structure comprising at its upper end a deflection member for deflecting the pipe from a first trajectory extending between the reel and the guide structure to a second substantially vertical trajectory, and a clamping member for carrying the vertical pipe section having second drive means for feeding the pipe along the vertical trajectory.

DESCRIPTION OF THE RELATED ART

Such a vessel is known from WO-96/35902 in which a pipe is spooled from a storage reel to a bending shoe mounted on a derrick structure that is situated above a moon pool. The vertical pipe section is passed via a 3-point straightening assembly into the water. The known J-lay vessel is particularly suitable for pipe laying in deep water. It is known to suspend the vertical pipe section from a clamping device or tensioner, which can be driven or braked to feed the vertical pipe section towards the seabed. The reel supplying the pipe is also driven or braked in a controlled manner.

Variations in pipe speed along the first trajectory between the reel and the deflection member will occur because the pipe coming from the reel will have a varying speed, even at constant reel rotation since the pipe is not always evenly spooled on the reel and the diameter of the unspooled pipe on the reel varies during the unspooling process. Also during start up and stopping and during emergency crash stop situations, speed variations of the pipe will occur along the first trajectory and along the vertical trajectory where the pipe is fed through the tensioners. Speed variations may also be caused by plasticity of the pipe and partial straightening upon unspooling. Because of the varying tension along the first trajectory between the reel and the deflection member, sagging of the pipe or overload of structural elements that guide the pipe may occur.

SUMMARY OF THE INVENTION

It is therefore an object of the present invention to provide a pipe lay system with which the tension of the pipe along the first trajectory can be maintained substantially constant. It is a further object of the present invention to provide a system in which differences in speed of the pipe section coming from the reel and the pipe section fed along the vertical trajectory can be compensated.

It is again a further object of the present invention to provide a pipe lay system having a relatively simple and reliable compensator system. Again, it is a further object of the present invention to provide a pipe lay system in which a pipe straightener is provided which is not affected by the tension compensation system and to provide a pipe straightener which can accommodate pipes of different diameter.

Thereto the pipe lay system of the present invention is characterised in that that a movable tension compensator is provided at the first pipe trajectory for lengthening or shortening the first pipe trajectory to maintain a substantially constant tension of the pipe along the first trajectory during unwinding of the reel By displacing the tension compensator, the first pipe trajectory can be lengthened or shortened to compensate for variations in speed due to non uniform winding of the pipe and varying diameter of the spooled pipe and to compensate for sagging of the pipe due to its own weight and length variations upon unspooling in view of occurring plasticity and partial straightening of the pipe. By the movable tension compensator, the tension in the pipe along the first trajectory (the back tension) can be maintained substantially constant.

In one embodiment of the pipe lay system according to the present invention, a detector is placed near the tension compensator for measuring its position relative to an equilibrium position. A control unit receives position signals from the detector and supplies a control signal to the drive means of the reel and/or to drive means of the clamping member for changing the pipe laying speed such that the tension compensator is at least substantially returned to its equilibrium position. When the tension in the pipe section between the reel and the deflection member becomes too large, the tension compensator will move such that the first trajectory is shortened. The control unit may either increase the unwind speed of the reel, such that the tension compensator is moved back to its equilibrium position or may lower the speed at which the pipe is fed along the vertical section. Similarly, when sagging of the pipe occurs, the tension compensator is moved such that the length of the first trajectory is increased. Decreasing the unspooling speed of the reel or increasing the pipe speed along the vertical section will result in the tension compensator returning to its equilibrium position.

Detecting the position of the tension compensator may be carried out optically or by encoders measuring a hinge angle of the compensator. The latter can occur when the tension compensator comprises a curved arm extending transversely to the vertical guide structure and being hingingly attached in a hinge point, remote from the guide structure. The end of the curved arm opposite the hinge point may be attached to a fluid cylinder, which is extended or compressed when the tension compensator moves away from its equilibrium position. In this case, measuring the pressure in said cylinder or measuring its stroke will provide a signal indicative of the deflection of the tension compensator from its equilibrium position.

In one embodiment according to the present invention, a pipe straightener element is provided on the hinging arm of the tension compensator, the pipe straightener element having a curved surface and a radius of curvature substantially originating in the hinge point. In this way the point of departure of the vertical pipe section from the upper pipe straightener element to the lower two pipe straightener elements can remain constant such that the pipe straightening moments in the pipe straightener remain unaffected by movement of the tension compensator.

Analysis of the shape of the pipe before entering the pipe straightener has taught the applicant that the curvature of the pipe in the region of the straightener varies for relatively large diameter pipes (diameters of about 40 cm or more) whereas Correlatively small diameter pipes (diameters of 10 cm or less) the curvature upon entry into the straightener is more or less constant. Especially for larger diameter pipes it is advantageous that at least one of the pipe straightener elements comprises a closed track around two rollers, at least one adjustable roller being placed between the two rollers for altering the width of the track. By controlling the track width of the pipe straightener, for instance by hydraulic cylinders or by screw spindles, a proper straightening for each pipe diameter can be obtained in combination with the movable tension compensator according to the present invention.

BRIEF DESCRIPTION OF THE DRAWINGS

An embodiment of the pipe lay system according to the present invention will be explained in detail with reference to the accompanying, non-limiting drawings. In the drawings:

FIG. 2 shows a schematic sideview of the pipe storage reel, the J-lay tower and the tension compensator of the present invention, FIG. 3 shows the tension compensator on an enlarged scale.

DESCRIPTION OF THE PREFERRED EMBODIMENTS

Figure 1:
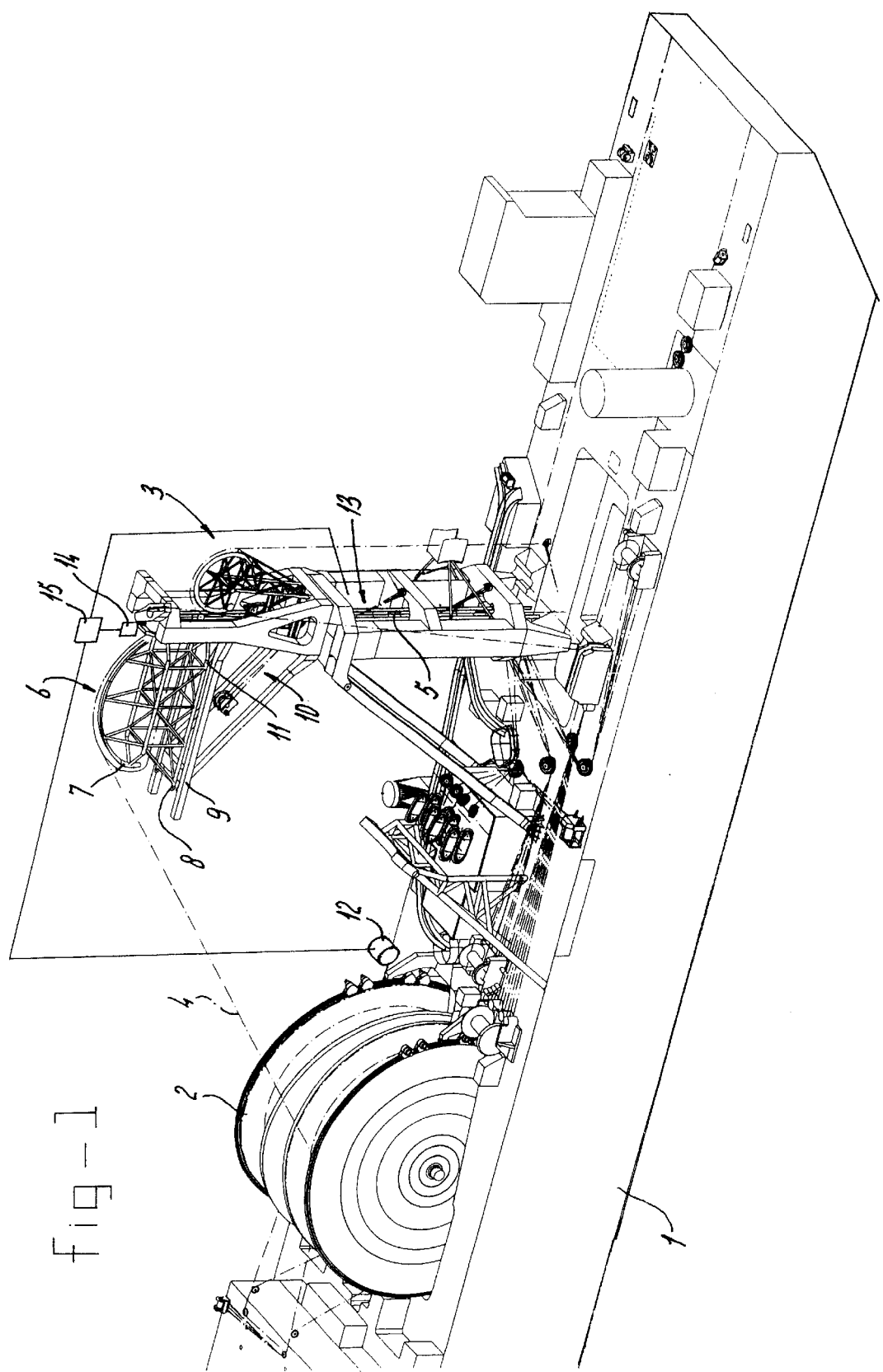
FIG. 1 shows a perspective view of a pipe lay vessel and J-lay tower according to the present invention.

FIG. 1 shows a pipe lay vessel 1 having a reel 2 and a vertical J-lay tower 3. This vessel is especially suitable for pipe laying in deep water such as up to 2500 meters. On the reel 2, which may have a diameter of 30 meters, a steel pipe, which has been welded on shore is spooled. The pipe may have a length of 50 km and may weigh 1.500 tons. Instead of a hard pipe, a flexible pipe may also be spooled on reel 2. The pipe is fed along a first trajectory 4 to the J-lay tower 3 and passes from thereon vertically downward to the seabed along a second trajectory 5. The pipe passes over a deflection member 6 which according to the present invention comprises a tension compensator having a curved arm or pipe aligner 7 which is with a first end part 8 hingingly attached to a horizontal support arm 9 of a frame 10. The second end part 11 of the arm 7 can move relative to the J-lay tower 3 around the hinge point at the first end part 8.

The reel 2 is driven by a schematically indicated drive means 12. It is, however also possible to unwind the reel 2 by the weight of the pipe length depending from the J-lay tower and to control rotation of the reel by engaging a brake with a braking surface of the reel 2. In the J-lay tower 3, the vertical pipe length is carried by tensioners 13, which clampingly engage the pipe along the vertical trajectory 5.

According to the present invention, a detector 14 is provided near the pipe aligner 7 of the tension compensator to measure the position of curved pipe aligner 7. On the basis of this position a detection signal is generated and passed to a control unit 15 which controls the drive motor 12 (or the brakes) of the reel 2 and/or the tensioners 13. The detector 14 may comprise an optical detector or an encoder measuring the rotation of the pipe aligner 7 around first end part 8. In a preferred embodiment, the detector 14 is provided by a sensor connected to a cylinder that is attached to a second end part 11 of the hinging arm 7, measuring the internal pressure or the stroke of the cylinder.

FIG. 2 schematically shows J-lay tower 3, the tensioner 13 and a pipe straightener 16. The tensioner 13 comprises four clamping members 17, 18, 19, 20, which in the configuration shown in FIG. 2, are closed and engage the vertical pipe section. Each clamping member 17–20 comprises spaced-apart rollers 21, 22 around which a steel track is placed in a closed loop. The track can be driven around the rollers 21, 22 to feed the pipe along the vertical pipe trajectory 5. Opposite clamping members 17, 19 and 18, 20 can be moved apart to disengage the pipe. Control unit 15 can control the speed of rotation of the belt around the rollers 21, 22 of the clamping members 17–20 or can control the distance of opposite clamping members 17, 19 and 18, 20 from the pipe, such that the speed at which the pipe travels past the clamping members 17–20 can be adjusted.

The pipe straightener 16 comprises three pipe straightening members 25, 26, 27. The lower pipe straightening members 26, 27 can be moved perpendicularly towards or away from the vertical pipe section. The pipe straightening members 25, 26, 27 each comprise a steel track which is placed in a closed loop configuration around two spaced-apart rollers, as can be seen more clearly in FIGS. 4a–4c.

FIG. 3 shows the frame 10 carrying the curved arm of the pipe aligner 7. The first end part 8 of a transverse arm 32 of the pipe aligner 7 is hingingly attached to the horizontal support arm 9 of the frame 10 in hinge point 30. The second end part 11 of the transverse arm 32 is attached to a hydraulic cylinder 31 which has its upper end attached to the J-lay tower 3. Depending on the weight (diameter) of the pipe on the reel 2, the pressure of the hydraulic cylinder is set to obtain a predetermined back tension in the pipe along trajectory 4. When the tension in the first pipe section increases, the cylinder 31 will be extended and the curved arm of the pipe aligner 7 will hinge downwardly around hinge point 30. When the tension in the pipe decreases, the cylinder 31 will lift the second end part 11 of the curved arm of the pipe aligner 7. The pressure in the cylinder 31 or the position of the piston rod can form an input signal for the control unit 15, the cylinder functioning as the detector 14, shown in FIG. 2. Although the invention is described in FIG. 3 using a hydraulic cylinder 31, other lifting devices, such as a counter weight or an electric drive motor may be used.

Figure 4A:
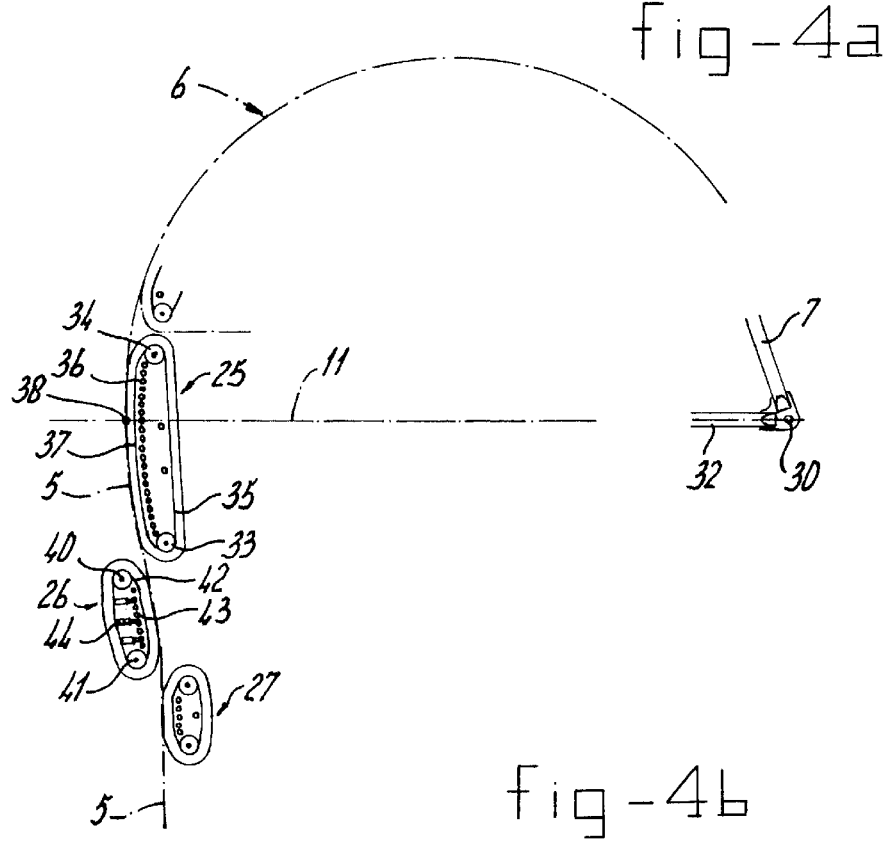
FIGS. 4a–4c show the tension compensator and pipe straightener for the equilibrium position, upon-overtensioning of the pipe and upon slackening of the pipe, respectively.
Figure 4B:
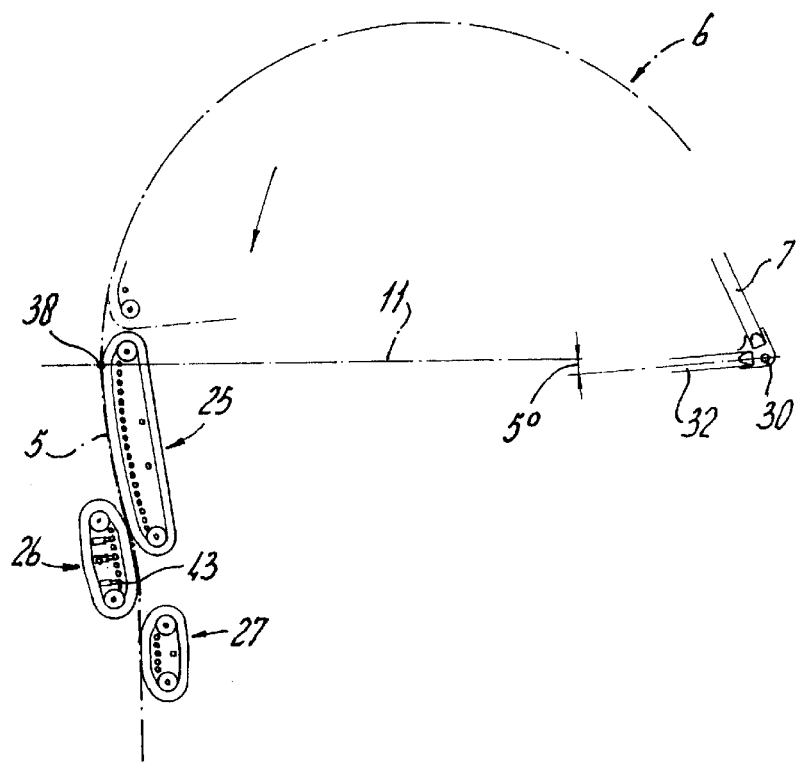
Figure 4C:
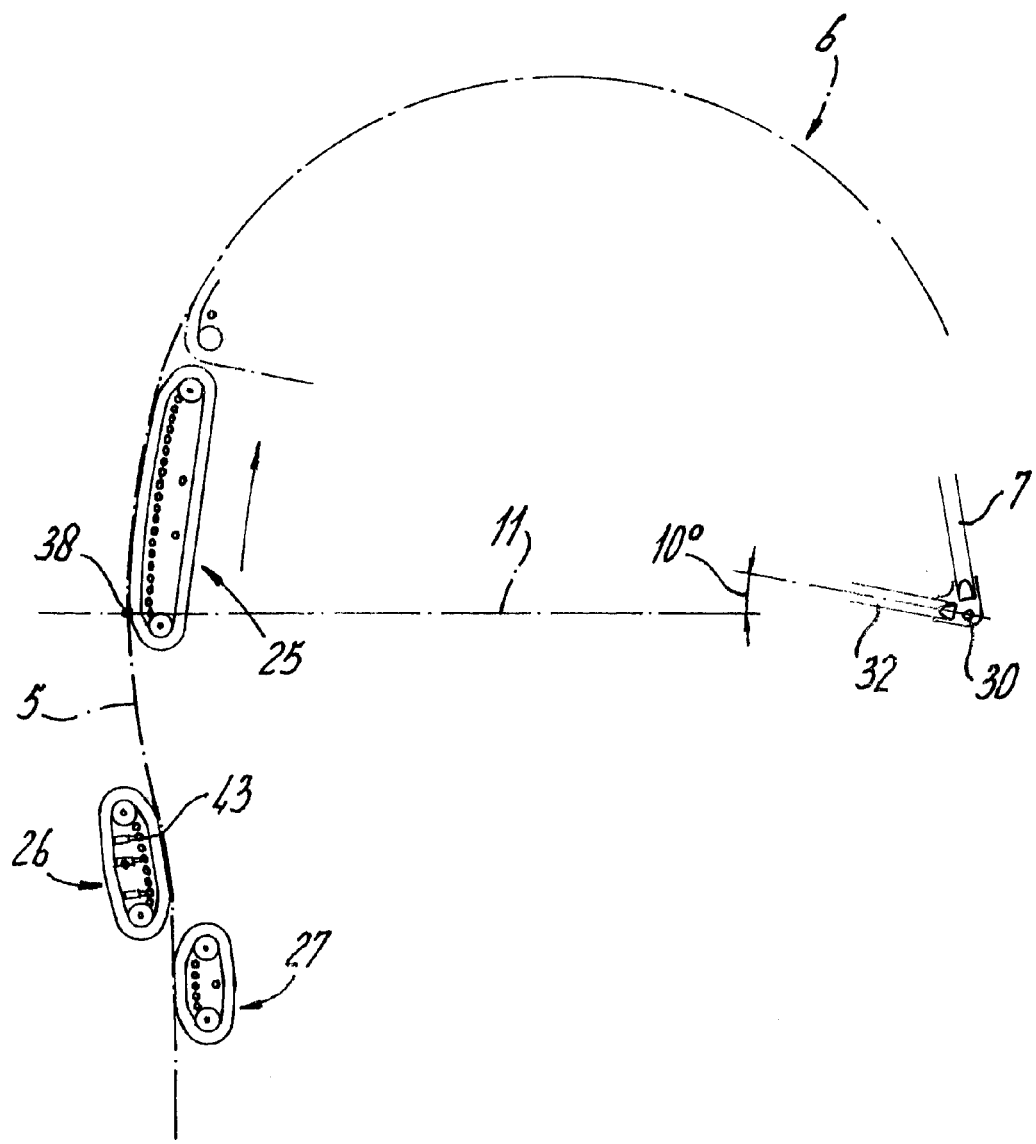

FIG. 4a shows the tension compensator of the deflection member 6 according to the present invention in its equilibrium position. The first pipe straightening member 25 is attached to second end part 11 of the transverse arm 32 of the deflection member 6. The first pipe straightening member 25 comprises two spaced-apart rollers 33, 34 and a steel track 35 placed in a closed loop around the rollers 33, 34. Central rollers 36 define a curved surface 37 having a radius of curvature located at the hinge point 30. Thereby, upon hinging of curved arm of the pipe aligner 7 around the hinge point 30, such as shown in FIGS. 4b and 4c for a downward and upward direction respectively, the curved surface 37 moves along the vertical pipe trajectory 5 while the point of departure 38 of the pipe from the curved surface 37 remains at a constant position with respect to pipe straightening members 26, 27. Thereby, the moments exerted by the pipe straightening members 25, 26, 27 remain constant and the pipe straightening operation is independent of the position of tension compensator.

In the preferred embodiment, the middle pipe straightening member 26 comprises spaced-apart rollers 40, 41 and a closed steel track 42. The central rollers 43 are each provided with adjustment members 44 such as hydraulic adjustment members or screw spindles, to move the central rollers 43 inwardly or outwardly with respect to the rollers 40, 41. In this way, the pipe straightening member 26 can be adjusted to accommodate pipes with different diameters. Thereby, especially large diameter pipes having a diameter of for instance 40 cm can be straightened properly by overbending to cause plastic deformation in order to ensure proper pipe straightening.

What is claimed is:

1. A pipe lay vessel (1) with a reel (2) for carrying a length of pipe and first drive means (12) for controlling rotation of said reel (2), and a substantially vertical guide structure (3) comprising at its upper end a deflection member (6) for deflecting the pipe from a first trajectory (4) extending between the reel (2) and the guide structure (3) to a second, substantially vertical trajectory (5), a clamping member (13) for carrying a vertical pipe section, the clamping member having second drive means (17, 18, 19, 20) for feeding the pipe along the vertical trajectory (5), characterized in that the deflection member (6) comprises a movable tension compensator (7) which is movable around an equilibrium position for lengthening or shortening the first trajectory (4) of the pipe to maintain a substantially constant tension of the pipe along the first trajectory during unwinding of the reel (2), and a force element (31) which controls displacement of the tension compensator (7) from its equilibrium position dependent on a tension force exerted on the tension compensator (7) by the pipe and which returns the tension compensator (7) to its equilibrium position at a predetermined tension of the pipe.

2. The pipe lay vessel (1) according to claim 1, further comprising a detector (14,31) for measuring the position of the tension compensator (7) relative to an equilibrium position, a control unit (15) for receiving a position signal from the detector (14, 31) and for supplying a control signal to the drive means (12) of the reel (2) and/or to the second drive means (17, 18, 19, 20) for changing the pipe laying speed such that the tension compensator (7) is at least substantially returned to its equilibrium position.

3. The pipe lay vessel (1) according to claim 1, characterized in that the tension compensator (7) comprises a curved arm extending transversely to the vertical guide structure (3) and being hingingly attached to said guide structure in a hinge point (30).

4. The pipe lay vessel (1) according to claim 3, characterized in that the hinge point (30) is located on an end part (8) of the curved arm remote from the guide structure (3), which end part (8) is connected to a support arm (9) extending transversely to the guide structure (3), the end of the curved arm near the guide structure (3) being connected to said guide structure (3) via a lifting device (31).

5. The pipe lay vessel (1) according to claim 3, characterized in that a pipe straightener element (25) is provided on the curved arm (7) near the vertical guide structure (3), the pipe straightener element (25) having a curved surface (37) with a radius of curvature substantially originating in the hingepoint (30).

6. The pipe lay vessel (1) according to claim 1, three pipe straightener elements (25,26,27) being provided along the vertical pipe trajectory (5), at least one pipe straightener element (26) comprising a closed track (42) around two rollers (40,41), at least one adjustable roller (43) being placed between the two rollers (40,41) for altering the width of the track.

7. The pipe lay vessel (1) according to claim 6, characterized in that the central pipe straightener element (26) comprises a track (42) which can be adjusted in width.

* * * * *